(12) United States Patent
Tanaka et al.

(10) Patent No.: US 11,607,851 B2
(45) Date of Patent: Mar. 21, 2023

(54) BUILDING METHOD AND BUILDING APPARATUS

(71) Applicant: MIMAKI ENGINEERING CO., LTD., Nagano (JP)

(72) Inventors: Yoshihiro Tanaka, Nagano (JP); Hiroyoshi Ohi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 886 days.

(21) Appl. No.: 16/122,906

(22) Filed: Sep. 6, 2018

(65) Prior Publication Data

US 2019/0099955 A1  Apr. 4, 2019

(30) Foreign Application Priority Data

Sep. 29, 2017  (JP) .............. JP2017-190877

(51) Int. Cl.
| | | |
|---|---|---|
| *B29C 64/393* | (2017.01) | |
| *B29C 64/112* | (2017.01) | |
| *B33Y 50/02* | (2015.01) | |
| *B33Y 30/00* | (2015.01) | |
| *B33Y 10/00* | (2015.01) | |
| *B29C 64/10* | (2017.01) | |
| *B29C 64/40* | (2017.01) | |

(52) U.S. Cl.
CPC ............ *B29C 64/393* (2017.08); *B29C 64/10* (2017.08); *B29C 64/112* (2017.08); *B29C 64/40* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2015/0258770 A1* | 9/2015 | Chan ................. | B32B 27/20 700/98 |
| 2016/0114542 A1* | 4/2016 | Quere ................ | G02C 7/022 264/1.1 |
| 2018/0264733 A1* | 9/2018 | Morovic ............ | G06F 30/00 |

FOREIGN PATENT DOCUMENTS

| | | |
|---|---|---|
| EP | 2431113 | 3/2012 |
| FR | 3014355 | 6/2015 |
| JP | 2003293012 | 10/2003 |
| JP | 2015093433 | 5/2015 |
| JP | 2015147326 | 8/2015 |
| JP | 2016107406 | 6/2016 |

(Continued)

OTHER PUBLICATIONS

"Search Report of Europe Counterpart Application," dated Mar. 29, 2019,p. 1-p. 8.

(Continued)

*Primary Examiner* — Monica A Huson
*Assistant Examiner* — Kelsey C Grace
(74) *Attorney, Agent, or Firm* — JCIPRNET

(57) ABSTRACT

To provide a building method and a building apparatus for building an object having an inconspicuous deposition streak. The building method includes: receiving, from a user, a data on a thickness of a machining allowance added to the object; generating a building data to which a machining allowance having an input thickness is added; generating the object by depositing a building material based on the building data; and polishing a surface of the object.

4 Claims, 7 Drawing Sheets

(56) References Cited

FOREIGN PATENT DOCUMENTS

JP   2017502334   1/2017
WO   2016208213   12/2016

OTHER PUBLICATIONS

Office Action of Japan Counterpart Application, with English translation thereof, dated Mar. 23, 2021, pp. 1-7.
Office Action of Japan Counterpart Application, with English translation thereof, dated Nov. 16, 2021, pp. 1-9.

* cited by examiner

BUILDING METHOD AND BUILDING APPARATUS

CROSS REFERENCE TO RELATED APPLICATIONS

This application claims the priority benefit of Japanese Patent Application No. 2017-190877, filed on Sep. 29, 2017. The entirety of the above-mentioned patent application is hereby incorporated by reference herein and made a part of this specification.

TECHNICAL FIELD

The present disclosure relates to a building method and a building apparatus.

BACKGROUND ART

In the related art, there is known a building apparatus (3D printer) that builds an object using an ink-jet head. In such a building apparatus, for example, the object is built by stacking a plurality of layers of ink formed by the ink-jet head.

In a case of building the object using the ink-jet head, an object colored in various colors can be built by using ink for coloring as a building material. The object can be variously decorated by drawing a design such as various characters and patterns on a surface of the object (Patent Literature 1).

Patent Literature 1: Japanese Unexamined Patent Publication No. 2015-147326

SUMMARY

In the object generated by additive manufacturing, a large number of layers of ink are stacked. In a case in which a side surface inclines with respect to a deposition direction, layers constitute a level difference, so that a stack of the layers seems to be a line shape in some cases. Hereinafter, this is called a "deposition streak". To cause the deposition streak to be inconspicuous, after building the object, performed is finish processing of polishing the surface of the object with a polishing film, sandpaper, and the like.

In building the colored object as described above, the ink for coloring is not used for the entire object, but for generating a color region near the surface of the object. There has been a problem such that, when the surface of the color object is polished, the color region of the object surface is thinned, and a surface color of the object is different from intended coloring. The color region is preferably thin to increase resolution of a color layer of the surface. By contrast, the color region is preferably thick to widen a color expression range of the color layer of the surface. Thus, there has been a demand for a function by which a user can select whether to give high priority to the resolution or to give high priority to the color expression range depending on a type and a size of the object.

In view of the background described above, the present disclosure provides a building method and a building apparatus for building an object in which a deposition streak is caused to be inconspicuous.

A building method according to the present disclosure is a method for building an object and includes: receiving a data on a thickness of a surface color region of the object from a user; generating a building data including the surface color region having the thickness; and generating the object by depositing a building material based on the building data.

With this configuration, color quality of the object surface can be controlled. For example, when the surface color region is thinned, a clear color can be reproduced with high-resolution. Alternatively, when the surface color region is thickened, stable and wide color reproducibility having small variation in lots can be achieved. In a case of having a clear region on the outside of the surface color region (that is, an outermost surface of the object), the surface color region encompasses the clear region.

The building method according to the present disclosure is the method for building the object and includes: receiving a data on a thickness of a machining allowance of the object from a user; generating a building data including the machining allowance having the thickness; generating the object by depositing a building material based on the building data; and polishing a surface of the object.

With this configuration, the object including a machining allowance is generated, so that a desired object having an inconspicuous deposition streak can be obtained by performing finish processing of polishing the machining allowance. The user can set the thickness of the machining allowance, so that the machining allowance having an appropriate thickness can be made as appropriate to the object.

In the building method according to the present disclosure, during generating the building data, the building data may be generated, and the generated building data includes a machining allowance made of a same building material as the building material of a surface color region of the object.

In this way, when the same building material is used for the machining allowance and the surface color region, there is no boundary between the surface color region and the machining allowance, and even when the machining allowance slightly remains at the polishing of the object, the remaining machining allowance becomes part of the surface color region of the object, whereby the remaining machining allowance is inconspicuous.

In the building method according to the present disclosure, during generating the building data, a color density of the surface color region and the machining allowance may be determined in accordance with the thickness of the machining allowance.

With the configuration according to the present disclosure, the color density of the surface color region can be lowered than intended color density depending on the thickness of the machining allowance, and surface colors can be prevented from being largely different from each other due to a slight difference in a machining amount. To lower the color density of the surface color region, for example, an amount of color ink constituting the surface color region may be reduced, and clear ink is mixed therein correspondingly to the reduced amount.

In the building method according to the present disclosure, during generating the building data, the building data may be generated, and the generated building data includes the machining allowance having the thickness equal to or smaller than a thickness of a clear ink layer.

In this way, by constituting the machining allowance with clear ink, even when the machining allowance remains in polish processing, the machining allowance is transparent and inconspicuous.

The building apparatus according to the present disclosure includes: an input portion, being configured to receive a data on a thickness of a surface color region of an object from the user; a building data generation portion, being configured to generate a building data including the surface color region having the thickness; and a building processing portion, being configured to generate the object by depositing a building material based on the building data.

With this configuration, color quality of the object surface can be controlled. For example, when the surface color region is thinned, a clear color can be reproduced with high-resolution. Alternatively, when the surface color region is thickened, stable and wide color reproducibility having small variation in lots can be achieved. As a result, the user can select whether to give high priority to the resolution or to give high priority to the color expression range depending on a type and a size of the object.

In the building apparatus according to the present disclosure, the input portion causes the thickness of the surface color region to be selected from a plurality of thicknesses.

With this configuration, the user can easily select the thickness of the surface color region.

The building apparatus according to the present disclosure includes: an input portion, being configured to receive a data on a thickness of a machining allowance of an object from a user; a building data generation portion, being configured to generate a building data including the machining allowance having the thickness; and a building processing portion, being configured to generate the object by depositing a building material based on the building data.

With this configuration, the object including the machining allowance is generated, so that a desired object having an inconspicuous deposition streak can be obtained by performing finish processing of polishing the object. The user can set the thickness of the machining allowance, so that the machining allowance having an appropriate thickness can be made as appropriate to the object.

In the building apparatus according to the present disclosure, the building data generation portion may generate the building data including the machining allowance made of a same building material as the building material of a surface color region of the object.

In this way, when the same building material is used for the machining allowance and the surface color region, there is no boundary between the surface color region and the machining allowance, and even when the machining allowance slightly remains in polishing the object thereafter, the remaining machining allowance becomes part of the surface color region of the object, whereby the remaining machining allowance is inconspicuous.

In the building apparatus according to the present disclosure, the building data generation portion may generate the building data including the surface color region and the machining allowance having a color density determined in accordance with the thickness of the machining allowance.

With the configuration according to the present disclosure, color density of the surface color region can be lowered than intended color density depending on the thickness of the machining allowance, and the surface colors can be prevented from being largely different from each other due to a slight difference in a machining amount. To lower the color density of the surface color region, for example, an amount of color ink constituting the surface color region may be reduced, and clear ink is mixed therein corresponding to the reduced amount.

In the building apparatus according to the present disclosure, the building data generation portion may generate the building data including the machining allowance having a thickness equal to or smaller than a thickness of a clear ink layer.

In this way, by constituting the machining allowance with clear ink, even when the machining allowance remains in polishing the object thereafter, the machining allowance is transparent and inconspicuous.

DESCRIPTION OF EMBODIMENTS

The following describes a building apparatus and a building method according to embodiments of the present disclosure with reference to the drawings.

First Embodiment

Figure 1A:
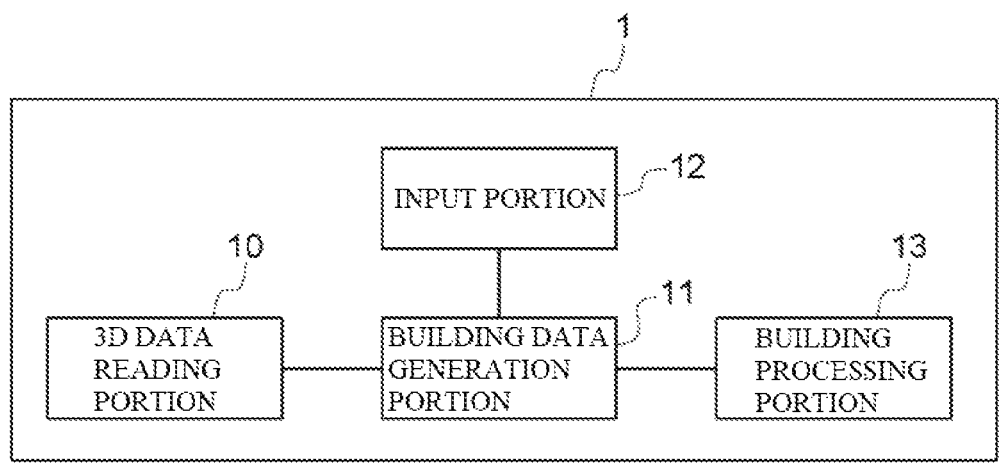
FIG. 1A is a diagram illustrating a configuration of a building apparatus according to an embodiment.
Figure 1B:
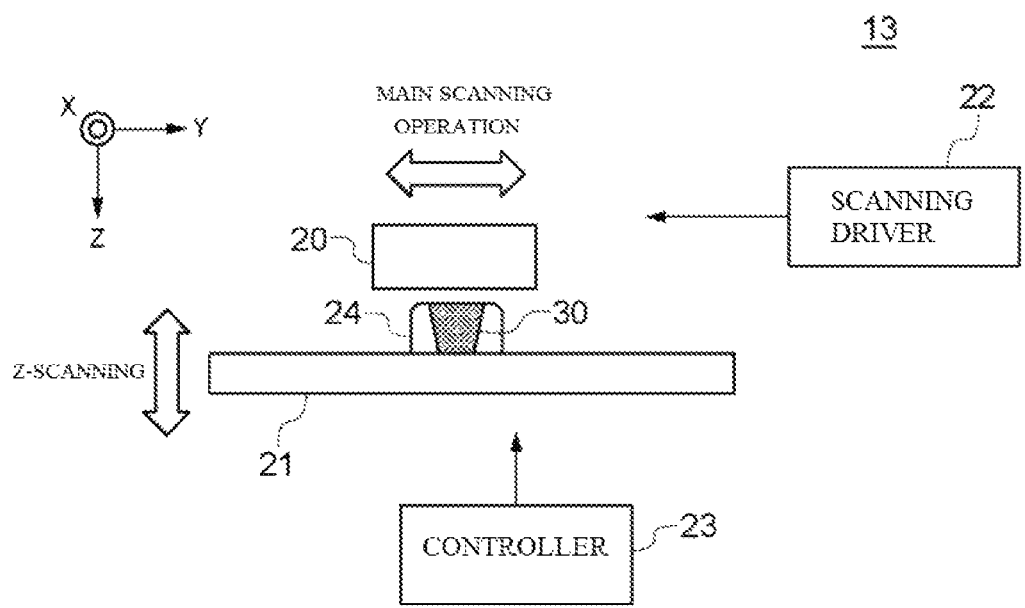
FIG. 1B is a diagram illustrating a configuration of a building processing portion.

FIGS. 1A and 1B are diagrams illustrating a configuration of a building apparatus 1 according to a first embodiment. As illustrated in FIG. 1A, the building apparatus 1 includes a 3D data reading portion 10 that reads 3D data on an object, a building data generation portion 11 that generates building data from the 3D data, an input portion 12 that receives an input of various settings and the like from a user, and a building processing portion 13 that deposits UV ink based on the building data to generate the object.

The 3D data is data on a shape and a surface color of the object and is created based on data on external appearance and the like obtained by photographing the object to be manufactured. The 3D data is, for example, handled as a file in a format such as "VRML", "OBJ", and "PLY." The building data generation portion 11 has a function of generating data that defines a material, a color, and the like constituting the object based on the 3D data, and defines which ink is applied to which position in each layer to be deposited to manufacture the object.

Figure 2:
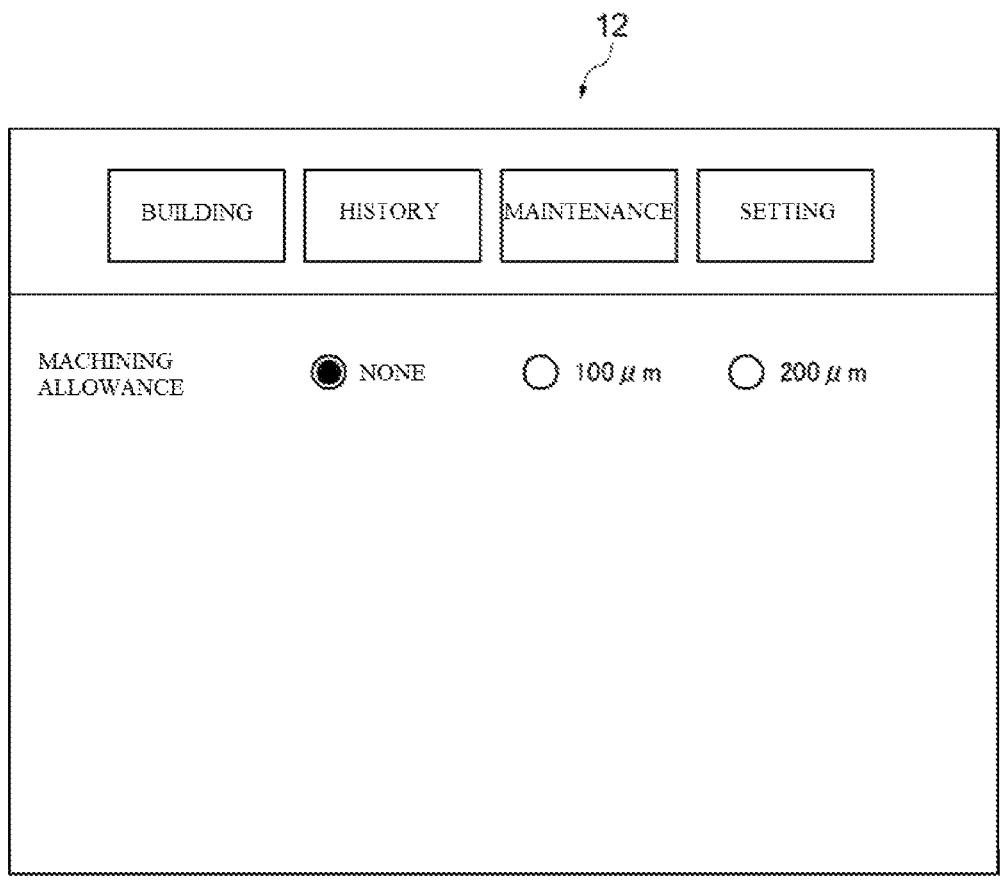
FIG. 2 is a diagram illustrating an example of an input portion.

FIG. 2 is a diagram illustrating an example of the input portion 12. The input portion 12 includes a building button for starting building, a history button for displaying a history of building in the past, a maintenance button for proceeding to a maintenance screen, and a setting button for proceeding to a setting screen of the building apparatus 1.

In FIG. 2, the setting screen is displayed. A machining allowance can be set on this screen. The setting of the machining allowance is to set a machining amount in finish processing of polishing the object. In the example illustrated in FIG. 2, the thickness of the machining allowance can be selected from "none", "100 μm", and "200 μm" with radio boxes. In place of the machining allowance, a setting of a thickness of a color layer may be selected from "150 μm", "250 μm", and "350 μm".

The input portion 12 receives a data input of the thickness of the machining allowance through the input screen illustrated in FIG. 2, and the input portion 12 passes the input data on the machining allowance to the building data generation portion 11. The building data generation portion 11 generates the building data using the data on the thickness of the machining allowance input through the input portion 12.

Figure 3:
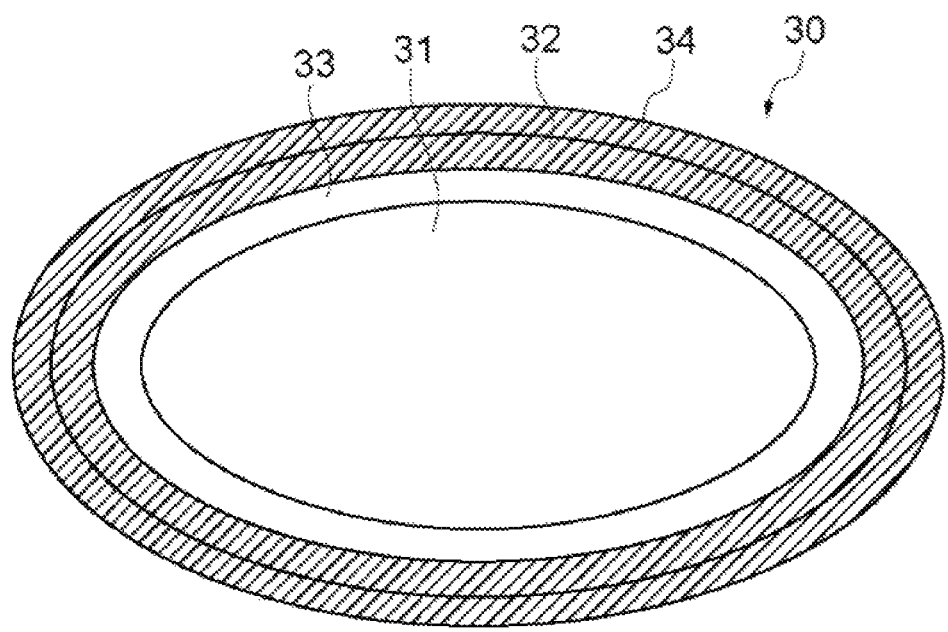
FIG. 3 is a diagram illustrating an object including a machining allowance.

The building data generation portion 11 generates the building data on an object 30 including the machining allowance. FIG. 3 is a diagram illustrating the object 30 including a machining allowance 34. A mold material 31 is filled within the object 30, and a surface color region 32 is formed near the surface. A white region (white layer/reflective layer) 33 is formed on an inner side (lower side) of the surface color region 32, and when light entered through the surface of the surface color region 32 is reflected by the white region 33, a color can be reproduced based on a principle of a subtractive process. The surface color region 32 has a certain thickness in a normal direction of the surface, and the surface color region 32 can keep color quality constant.

There is the machining allowance 34 continuous to the surface color region 32 on the outside of the surface color region 32. The machining allowance 34 has a certain thickness in the normal direction of the surface. The thickness of the machining allowance 34 is based on the data on the thickness input through the input portion 12. The same building material as that of the surface color region 32 is used for the machining allowance 34. An external shape of the object 30 formed by a surface of the outermost layer excluding the machining allowance 34 of the object 30 is constant independent of the thickness of the machining allowance 34 or the thickness of the surface color region 32. That is, variation in the thickness of each layer is directed toward the inside in the normal direction of the surface. Accordingly, the object 30 is built while maintaining the external shape of the read 3D data.

Figure 4A:
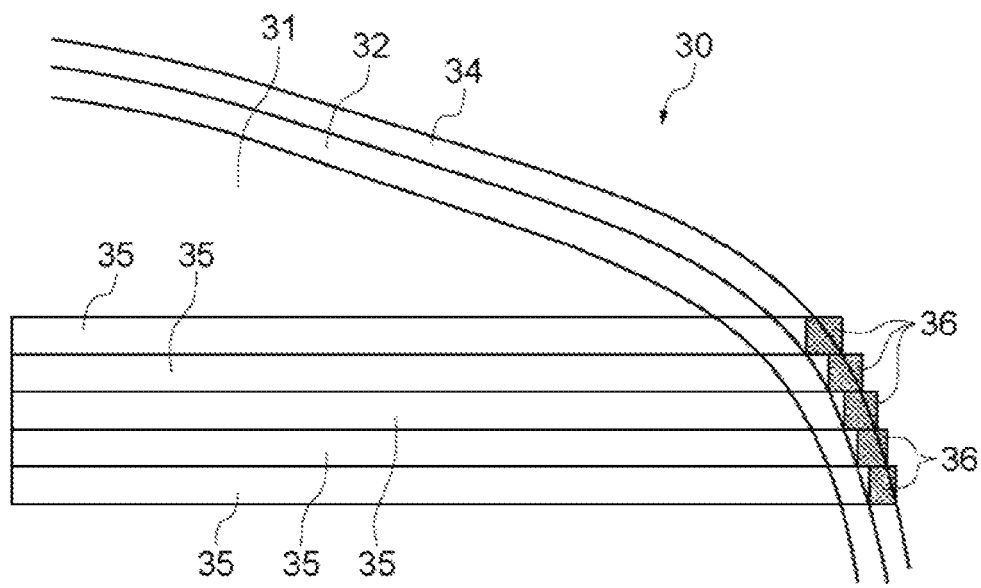
FIG. 4A is a diagram illustrating layers constituting the object including the machining allowance.

FIG. 4A is a diagram illustrating respective layers 35 constituting the object 30 including the machining allowance 34. As illustrated in FIG. 4A, each layer 35 constituting the object 30 becomes longer than a case not including the machining allowance 34 corresponding to a portion 36 that covers the added machining allowance 34. As illustrated in FIG. 4A, by adding the machining allowance 34, the surface color region 32 is maintained when the surface is polished to be smoothed, so that the surface color of the object 30 can be maintained in a desired color.

Figure 4B:
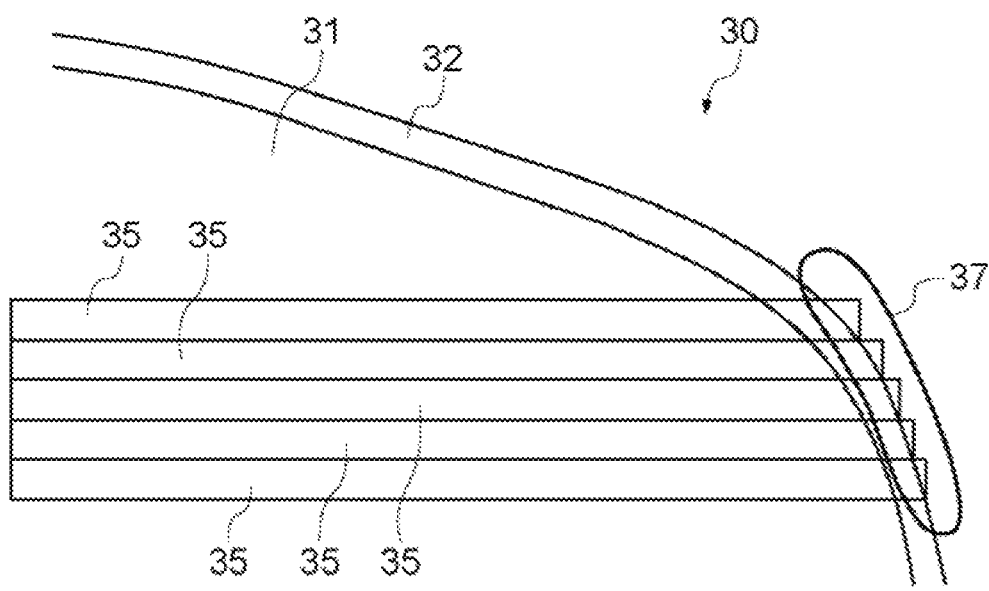
FIG. 4B is a diagram illustrating layers constituting the object not including the machining allowance.

FIG. 4B is a diagram illustrating a configuration of the object 30 not including the machining allowance. As illustrated in FIG. 4B, when the machining allowance 34 is not added, part of the surface color region 32 may be shaved off as illustrated as a region 37, for example, in a polishing process of the surface, and coloring of the surface may be changed.

Subsequently, the following describes the building processing portion 13 with reference to FIG. 1B. The building processing portion 13 is a device that builds the stereoscopic object 30 by additive manufacturing by ejecting UV ink. As illustrated in FIG. 1B, the building processing portion 13 includes a head 20, a stage 21, a scanning driver 22, and a controller 23.

The head 20 is a portion that ejects droplets to be the material of the object 30, and the head 20 ejects the UV ink to be cured to form the layers constituting the object 30 in a stacking manner. The head 20 includes a plurality of ink-jet heads, a UV light source, a flattening roller, and the like.

The head 20 can also form a support layer 24 around the object 30. The support layer 24 is, for example, a deposition structure that supports the object 30 by surrounding an outer circumference of the object 30 being built. The support layer 24 is formed as needed at the time of building the object 30, and the support layer 24 is removed after the building is completed.

The stage 21 is a table-like member on which the object 30 being built is placed, and the stage 21 is arranged at a position opposed to the ink-jet head 30 in the head 20. At least an upper surface of the stage 21 is configured to be able to move upward and downward in the deposition direction, and when the stage 21 is driven by the scanning driver 22, at least the upper surface is moved in accordance with progress of the building of the object 30. In this example, the deposition direction is a direction (Z-direction in the drawing) orthogonal to a main scanning direction (Y-direction in the drawing) and a sub scanning direction (X-direction in the drawing) set in advance in the building processing portion 13.

The scanning driver 22 is a driver that causes the head 20 to perform a scanning operation of moving relatively to the object 30. The scanning driver 22 causes the head 20 to perform a main scanning operation (Y-scanning), a sub scanning operation (X-scanning), and scanning in the deposition direction (Z-scanning) as the scanning operation. Herein, the main scanning operation is an operation of ejecting ink from the head 20 while moving the head 20 in the main scanning direction (Y-direction).

The controller 23 is, for example, a CPU of the building processing portion 13, and controls the building operation of the object 30 by controlling each part of the building processing portion 13. The CPU of the building processing portion 13 may also serve as a CPU of the building data generation portion 11. The controller 23 controls each part of the building processing portion 13 based on the building data generated by the building data generation portion 11. Due to this, the building processing portion 13 stacks materials used for building in the deposition direction, and the building processing portion 13 builds the object 30 by additive manufacturing.

Figure 5:
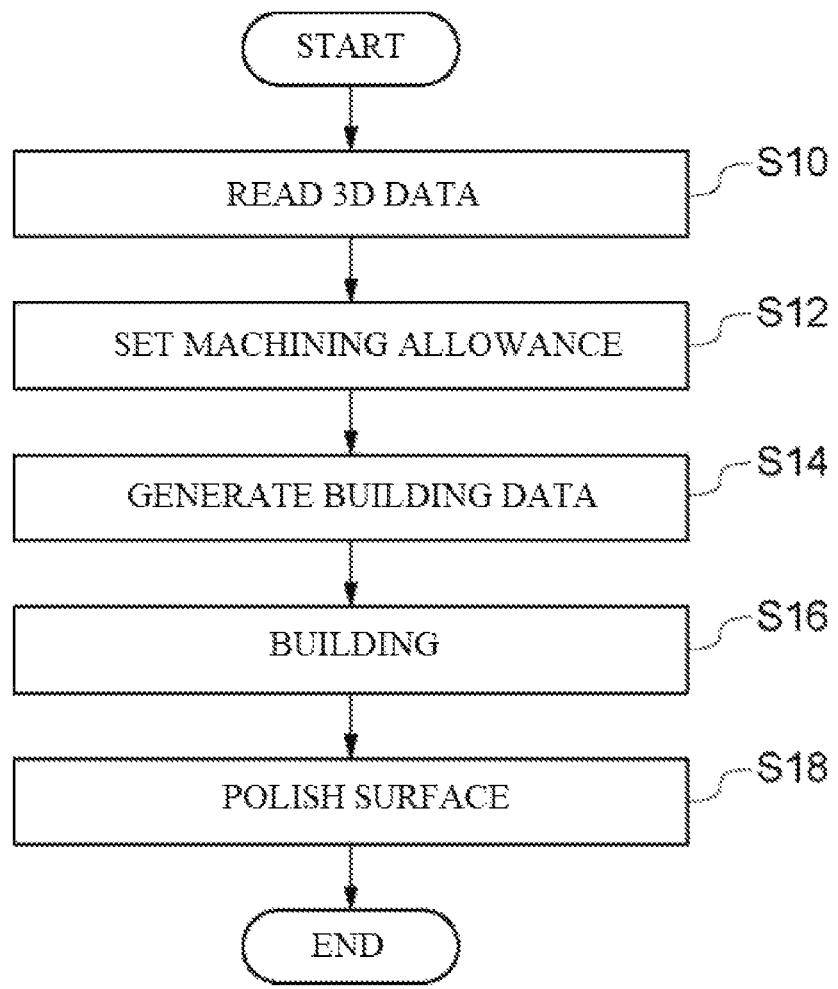
FIG. 5 is a flowchart illustrating an operation of a building apparatus according to a first embodiment.

FIG. 5 is a flowchart illustrating an operation of the building method according to the first embodiment. First, the building apparatus 1 reads 3D data on the object 30 (S10). Subsequently, the user sets the thickness of the machining allowance 34 through the input portion 12 (S12), and the building apparatus 1 generates the building data on the object 30 using the data on the set thickness of the machining allowance 34 (S14). The building data is data on each layer for generating the object 30 including the machining allowance 34. The building apparatus 1 performs building based on the generated building data (S16) and performs finish processing of polishing the generated object 30 (S18). Through the above operations, the object 30 is completed. The finish processing of polishing the object 30 may be performed by a person or by a machine.

Second Embodiment

Next, the following describes the building apparatus according to a second embodiment. A basic configuration and operation of the building apparatus according to the second embodiment are the same as those in the first embodiment. In the second embodiment, at the time when the building data generation portion 11 adds the machining allowance to the object 30, color density of the surface color region 32 of the object 30 is changed in accordance with the thickness of the machining allowance.

Figure 6:
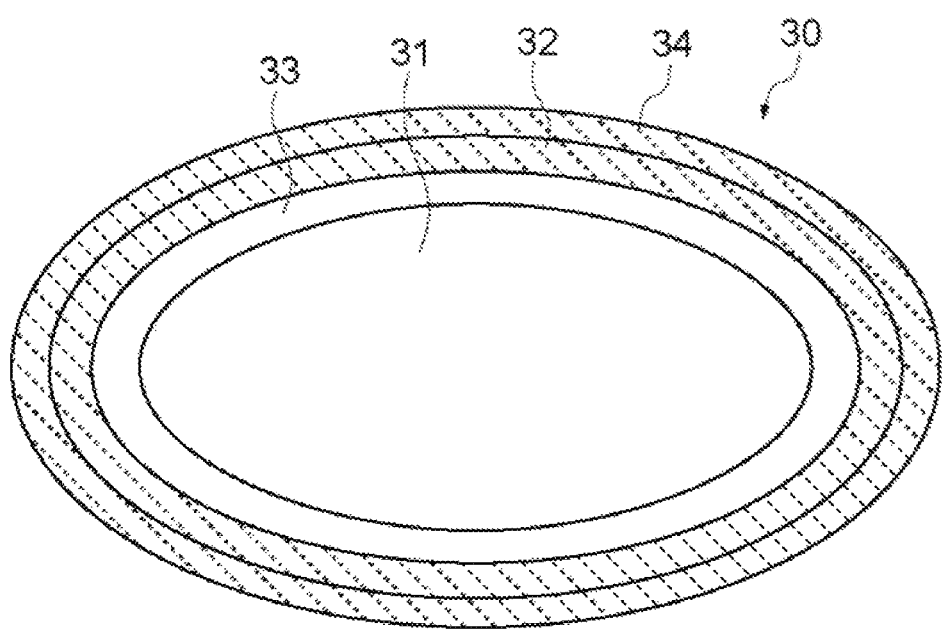
FIG. 6 is a diagram illustrating the object including the machining allowance.

FIG. 6 is a diagram illustrating an example of the building data including the machining allowance 34. In the second embodiment, the color density is lowered corresponding to the thickness of the machining allowance 34, and the machining allowance 34 made of the building material having the same color density as the lowered color density is added. To lower the color density, density of the color ink is lowered, but design is made such that clear ink is filled in a portion where the color ink is not present.

As an example of the color density of the building data, an amount of the color ink for generating the surface color region 32 and the machining allowance 34 is the same as an amount of the color ink for generating the surface color region in a case of not including the machining allowance. For example, if volume of the surface color region 32 is equal to volume of the machining allowance 34, the color density is caused to be ½. Accordingly, the surface color of the object 30 related to the building data becomes substantially the same as the surface color of the object 30 related to the 3D data.

In a case in which the thickness of the surface color region 32 is small and the color density thereof is high, slightly excessive polishing or an unpolished part in processing of polishing the surface may largely influence the surface color of the object 30. In the present embodiment, by lowering the color density of the surface color region 32 and the machining allowance 34 and by securing the thickness of the machining allowance 34 in a certain degree, sensitivity to a difference in the thickness of the surface color region 32 is lowered, and the processing of polishing the surface can be facilitated.

Third Embodiment

Next, the following describes a building apparatus according to a third embodiment. A basic configuration and operation of the building apparatus according to the third embodiment are the same as those in the first embodiment. In the third embodiment, clear ink is used for the machining allowance to be added to the surface of the object 30.

Figure 7:
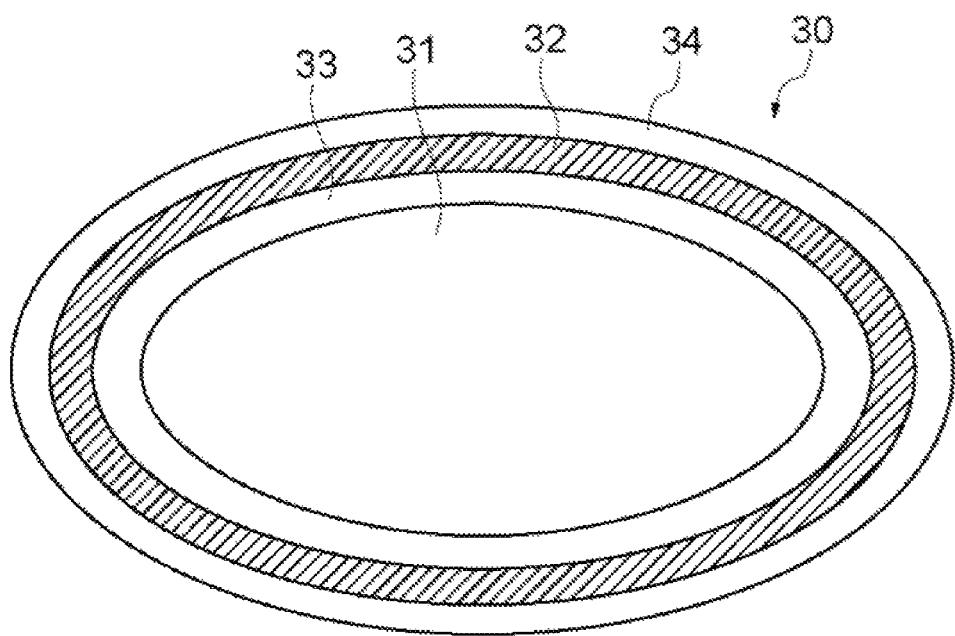
FIG. 7 is a diagram illustrating the object including the machining allowance.

FIG. 7 is a diagram illustrating the building data on the object 30 generated by the building apparatus according to the third embodiment. As illustrated in FIG. 7, the machining allowance 34 made of the clear ink is added to the object 30.

Effect of Embodiments (1) The building method according to the present embodiment includes Step S12 for receiving the data on the thickness of the machining allowance of the object 30 from the user, Step S14 for generating the building data including the machining allowance 34 having the set thickness, and Step S16 for generating the object 30 by depositing the building material based on the building data. The building apparatus 1 according to the present embodiment includes the input portion 12 that receives the data on the thickness of the machining allowance 34 of the object 30 from the user, the building data generation portion 11 that generates the building data including the machining allowance 34 having the set thickness, and the building processing portion 13 that generates the object 30 by depositing the building material based on the building data.

With this configuration, the object 30 including the machining allowance 34 is generated, so that the desired object 30 having an inconspicuous deposition streak can be obtained by performing finish processing of polishing the machining allowance 34. The user can set the thickness of the machining allowance 34, so that the machining allowance 34 having an appropriate thickness can be made as appropriate to the object 30.

(2) In the building method of the first embodiment, at Step S14 for generating the building data, generated is the building data including the machining allowance 34 made of the same building material as that of the surface color region 32 of the object 30. In the building apparatus 1 according to the first embodiment, the building data generation portion 11 generates the building data including the machining allowance 34 made of the same building material as that of the surface color region of the object 30.

In this way, when the same building material is used for the machining allowance 34 and the surface color region 32, there is no boundary between the surface color region 32 and the machining allowance 34, and even when the machining allowance 34 slightly remains at Step S18 for polishing the object 30, the remaining machining allowance 34 becomes part of the surface color region of the object 30, whereby the remaining machining allowance is inconspicuous.

(3) In the building method according to the second embodiment, at Step S14 for generating the building data, the color density of the surface color region 32 and the machining allowance 34 is determined in accordance with the thickness of the machining allowance 34. In the building apparatus according to the second embodiment, the building data generation portion 12 generates the building data including the surface color region 32 and the machining allowance 34 having the color density determined in accordance with the thicknesses of the surface color region 32 and the machining allowance 34.

With this configuration, the color density is adjusted in accordance with the thicknesses of the surface color region 32 and the machining allowance 34, so that the surface color of the object 30 can be prevented from being darkened due to the machining allowance 34.

(4) In the building method according to the third embodiment, at Step S14 for generating the building data, the building data including the machining allowance made of clear ink is generated. In the building apparatus according to the third embodiment, the building data generation portion 11 generates the building data including the machining allowance made of clear ink.

In this way, by constituting the machining allowance with clear ink, even when the machining allowance remains in polishing the object 30, the machining allowance is transparent and inconspicuous.

INDUSTRIAL APPLICABILITY

The present disclosure is useful as a building apparatus that performs building by additive manufacturing, for example.

What is claimed is:

1. A building method for building an object, comprising:
receiving a data on a thickness of a machining allowance of the object from a user;
generating a building data including the machining allowance having the thickness;
generating the object by depositing a building material based on the building data; and
polishing a surface of the object, wherein
a surface color region of the object is formed by mixing a color material and a clear material that is transparent, wherein the color material and the clear material are as the building material,
the machining allowance is a thickness at which the surface of the object is polished by the step of polishing the surface of the object;
the step of polishing the surface of the object is to polish the machining allowance on the surface of the object;
wherein the step of generating the building data further comprises: determining a mixing ratio of the color material and the clear material in the surface color region and the machining allowance in order to express a color density of the surface color region and the machining allowance in accordance with the thickness of the machining allowance.

2. The building method according to claim 1, wherein during generating the building data, generated is the building data including the machining allowance having the thickness equal to or smaller than a thickness of a clear ink layer.

3. The building method according to claim 1, wherein the surface color region is formed by mixing the color material and the clear material as a whole.

4. The building method according to claim 1, wherein the building material is ink, and
a support layer is provided so as to surround an outer circumference of the object and support the object being built.

* * * * *